(12) United States Patent
Bliley et al.

(10) Patent No.: US 6,622,264 B1
(45) Date of Patent: Sep. 16, 2003

(54) PROCESS AND SYSTEM FOR ANALYZING FAULT LOG DATA FROM A MACHINE SO AS TO IDENTIFY FAULTS PREDICTIVE OF MACHINE FAILURES

(75) Inventors: Richard G. Bliley, Erie, PA (US); Nicholas E. Roddy, Clifton Park, NY (US)

(73) Assignee: General Electric Company

( * ) Notice: Subject to any disclaimer, the term of this patent is extended or adjusted under 35 U.S.C. 154(b) by 0 days.

(21) Appl. No.: 09/447,064

(22) Filed: Nov. 22, 1999

Related U.S. Application Data

(60) Provisional application No. 60/161,972, filed on Oct. 28, 1999.

(51) Int. Cl.⁷ .................................................. G06F 11/00
(52) U.S. Cl. ........................................... 714/26; 714/37
(58) Field of Search ........................... 714/26, 33, 37, 714/45, 25; 706/51, 61, 50, 58

(56) References Cited

U.S. PATENT DOCUMENTS

| | | | |
|---|---|---|---|
| 3,805,038 A | * 4/1974 | Buedel et al. ................. 714/31 |
| 4,062,061 A | 12/1977 | Batchelor et al. |
| 4,270,174 A | 5/1981 | Karlin et al. |
| 4,322,813 A | 3/1982 | Howard et al. |
| 4,463,418 A | 7/1984 | O'Quin, II et al. |
| 4,517,468 A | 5/1985 | Kemper et al. |
| 4,521,847 A | 6/1985 | Ziehm et al. |
| 4,633,467 A | * 12/1986 | Abel et al. ..................... 714/3 |
| 4,695,946 A | 9/1987 | Andreasen et al. |
| 4,823,914 A | 4/1989 | McKinney et al. |
| 4,884,266 A | * 11/1989 | Pflaumer .................... 370/545 |
| 4,970,725 A | 11/1990 | McEnroe et al. |
| 4,977,390 A | 12/1990 | Saylor et al. |
| 5,023,817 A | 6/1991 | Au et al. |
| 5,113,489 A | 5/1992 | Cihiwsky et al. |
| 5,123,017 A | 6/1992 | Simpkins et al. |
| 5,127,005 A | 6/1992 | Oda et al. |
| 5,157,610 A | 10/1992 | Asano et al. |
| 5,210,704 A | 5/1993 | Husseiny |
| 5,255,208 A | 10/1993 | Thakore et al. |
| 5,274,572 A | 12/1993 | O'Neill et al. |
| 5,282,127 A | 1/1994 | Mii |
| 5,282,212 A | 1/1994 | Shah |
| 5,287,505 A | 2/1994 | Calvert et al. |
| 5,321,837 A | 6/1994 | Daniel et al. |
| 5,329,465 A | 7/1994 | Arcella et al. |
| 5,351,247 A | * 9/1994 | Dow et al. .................... 706/14 |
| 5,400,018 A | 3/1995 | Scholl et al. |
| 5,406,502 A | 4/1995 | Haramaty et al. |
| 5,414,645 A | 5/1995 | Hirano |
| 5,445,347 A | 8/1995 | Ng |
| 5,463,768 A | 10/1995 | Cuddihy et al. |

(List continued on next page.)

FOREIGN PATENT DOCUMENTS

| JP | 04213123 A | * 8/1992 | ........... G06F/11/22 |
|---|---|---|---|
| JP | 08044641 A | * 2/1996 | ........... G06F/13/00 |

OTHER PUBLICATIONS

U.S. patent application Ser. No. 09/285,612, Anil Varma, et al., filed Apr. 2, 1999, pending.

(List continued on next page.)

*Primary Examiner*—Robert Beausoliel
*Assistant Examiner*—Gabriel Chu
(74) *Attorney, Agent, or Firm*—Carl Rowold, Esq.; Enrique J. Mora, Esq.; Beusse, Brownlee, Bowdoin & Wolter, PA

(57) ABSTRACT

A process for analyzing fault log data from a machine is provided. The process allows for downloading new fault log data from the machine. The process further allows for retrieving prior fault log data of the machine. The prior fault log data may be obtained during an earlier download relative to a present download of new fault log data. A comparing step allows for comparing the new fault log data against the prior fault log data, and an adjusting step allows for adjusting any repair recommendations for the earlier download of fault log data based upon the comparison of the new fault log data and the prior fault log data.

30 Claims, 8 Drawing Sheets

U.S. PATENT DOCUMENTS

| | | | |
|---|---|---|---|
| 5,508,941 A | | 4/1996 | Leplingard et al. |
| 5,515,503 A | * | 5/1996 | Shimomura et al. .......... 706/54 |
| 5,528,516 A | | 6/1996 | Yemini et al. |
| 5,539,877 A | * | 7/1996 | Winokur et al. .............. 714/25 |
| 5,566,091 A | | 10/1996 | Schricker et al. |
| 5,594,663 A | | 1/1997 | Messaros et al. |
| 5,596,712 A | | 1/1997 | Tsuyama et al. |
| 5,631,831 A | | 5/1997 | Bird et al. |
| 5,633,628 A | | 5/1997 | Denny et al. |
| 5,638,296 A | | 6/1997 | Johnson et al. |
| 5,661,668 A | | 8/1997 | Yemini et al. |
| 5,666,481 A | * | 9/1997 | Lewis .......................... 714/15 |
| 5,666,534 A | | 9/1997 | Gilbert et al. |
| 5,678,002 A | | 10/1997 | Fawcett et al. |
| 5,680,541 A | | 10/1997 | Kurosu et al. |
| 5,729,452 A | | 3/1998 | Smith et al. |
| 5,737,215 A | | 4/1998 | Schricker et al. |
| 5,742,915 A | | 4/1998 | Stafford |
| 5,774,645 A | | 6/1998 | Beaujard et al. |
| 5,790,780 A | | 8/1998 | Brichta et al. |
| 5,799,148 A | | 8/1998 | Cuddihy et al. |
| 5,815,071 A | | 9/1998 | Doyle |
| 5,835,871 A | | 11/1998 | Smith et al. |
| 5,845,272 A | | 12/1998 | Morjaria et al. |
| 5,862,316 A | | 1/1999 | Hagersten et al. |
| 5,928,369 A | | 7/1999 | Keyser et al. |
| 5,950,147 A | | 9/1999 | Sarangapani et al. |
| 5,956,664 A | | 9/1999 | Bryan |
| 6,012,152 A | * | 1/2000 | Douik et al. ................... 714/26 |
| 6,052,631 A | | 4/2000 | Busch et al. |
| 6,078,851 A | | 6/2000 | Sugitani |
| 6,144,901 A | | 11/2000 | Nickles et al. |
| 6,175,934 B1 | | 1/2001 | Hershey et al. |
| 6,216,066 B1 | | 4/2001 | Goebel et al. |
| 6,243,628 B1 | | 6/2001 | Bliley et al. |
| 6,263,265 B1 | | 7/2001 | Fera |
| 6,301,531 B1 | | 10/2001 | Pierro et al. |
| 6,324,659 B1 | | 11/2001 | Pierro |
| 6,336,065 B1 | | 1/2002 | Gibson et al. |
| 6,338,152 B1 | | 1/2002 | Fera et al. |
| 6,343,236 B1 | | 1/2002 | Gibson et al. |
| 6,400,943 B1 | * | 6/2002 | Montoya ............... 342/357.01 |
| 6,405,108 B1 | | 6/2002 | Patel et al. |

OTHER PUBLICATIONS

U.S. patent application Ser. No. 09/688,105, Anil Varma, et al., filed Oct. 13, 2000, pending.

Data–Tronic Gas Turbine Information And Control System; General Electric Gas Turbine Reference Library; 8 pgs.

Dicquemare P.; "Lews nouveaux equipements de control pour une maintenance predictive des vanes;" Revue Generale Nucleaire RGN, Fr. Revue Generale De Lelectricite S.AA. Paris, No. 2, Mar. 1, 1998, pp 17–22, XP000774756.

Isermann R.; "Proceess Fault Diagnosis Based on Process Model Knowledge;" Advanced Information Processing in Automatic Control; Selected Papers from THR IFAC/IMACS/IFORS Symposium, XX, XX, Jul. 3, 1989, pp. 21–34, XP000949487.

Trobec R. et al; "Optimization Of Diagnosis Examination"; Joint International Conference On Vector And Parallel Processing; Berlin De 1994, pp 761–772, XP000974309.

* cited by examiner

| CUST | UNIT | DATE | CODE | DESC | DESC1 |
|---|---|---|---|---|---|
| RR | 3500 | Sun Jul 13 1997 | 1111 | Piping Fittings–Engine Intercooler | REPAIRED WATER LEAK AT TOP OF RT |
| RR | 3500 | Tue Jul 01 1997 | 2222 | Lube Oil–Engine | WATER IN LUBE OIL CHANGED OIL |
| RR | 3500 | Sat Jun 28 1997 | 3333 | BRP–Battery Charger Regulator Panel | NO BATTCHARGE–REPL BPR |
| RR | 3500 | Wed Jun 18 1997 | 4444 | EFI–High Pressure Pump | REPLACE 3 HP PUMPS NOT FOR FIRING |
| RR | 3500 | Mon Jun 09 1997 | 5555 | Turbocharger Assembly General–Eng | TURBO DRAGSSECONDARY DAMAGE–RPL |
| RR | 3500 | Sat May 24 1997 | 6666 | Cylinder Assembly General–Eng | REPL R6 PA FOR SECONDARY DAMAGE |
| RR | 3500 | Sat May 24 1997 | 7777 | Cylinder Assembly General–Eng | TRIPPING COP PISTON FAILURE CO |

32 33 34 35 36 37

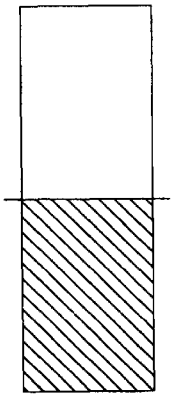

Fig. 2A

| FAILMODE_DESC | SUB_ASSEMBLY_CODE | MAIN_ASSEMBLY_CODE |
|---|---|---|
| LEAKING FLUIDAIR | ENGINTCOOL | ENGINE |
| CONTAMINATED | LUBEOIL | ENGISUPT |
| UNKNOWNUNDETERMINED | POWERPANEL | POWERELN |
| UNKNOWNUNDETERMINED | ENGFUELINJ | ENGINE |
| UNKNOWNUNDETERMINED | ENGTURBO | ENGINE |
| UNKNOWNUNDETERMINED | POWERASSY | ENGINE |
| UNKNOWNUNDETERMINED | POWERASSY | ENGINE |

30

```
                                                    ┌ 48
┌─ 40
 0   1  2    0  101  97 R E 0 0         Intake Manifold Air Too
 0   1  2    0  101  97 R E 0 0         Intake Manifold Air Too
992 288 4706 202 177 182 M E F O 6AB_M_S_  COP Trip
992 288 4706 202 177 182 M E F O 6AB_M_S_  COP Trip
885 338 2864 133 175 186 M E 2 4 6AB_M_S_  COP Trip
885 338 2864 133 175 186 M E 2 4 6AB_M_S_  COP Trip
458   6    0   0 174 186 R E F 4 EAB       Fault Reset While in Lc
458   6    0   0 174 186 R E F 4 EAB       Fault Reset While in Lc
992 474 3005 148 180 187 M E 2 0 R 6AB_M_S_ COP Trip
992 474 3005 148 180 187 M E 2 0 R 6AB_M_S_ COP Trip
1010 506 2405 128 179 189 M E F 4 6AB_M_S_ COP Trip
```

PROCESS AND SYSTEM FOR ANALYZING FAULT LOG DATA FROM A MACHINE SO AS TO IDENTIFY FAULTS PREDICTIVE OF MACHINE FAILURES

This application claims the benefit of U. S. Provisional Application 60/161,972 filed Oct. 28, 1999.

BACKGROUND OF THE INVENTION

The present invention relates generally to machine diagnostics, and more specifically, to a process and system for analyzing fault log data so as to ensure identification of faults and/or fault combinations predictive of machine malfunctions.

A machine, such as a locomotive or other complex systems used in industrial processes, medical imaging, telecommunications, aerospace applications, power generation, etc., includes elaborate controls and sensors that generate faults when anomalous operating conditions of the machine are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences—or cases) is applicable to problem solving as learning rules or behaviors. CBR relies on relatively little pre-processing of raw knowledge, focusing instead on indexing, retrieval, reuse, and archival of cases. In the diagnostic context, a case refers to a problem/solution description pair that represents a diagnosis of a problem and an appropriate repair.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit. Unfortunately, for a continuous fault code stream where any or all possible fault codes may occur from zero to any finite number of times and where the fault codes may occur in any order, predefining the structure of a case is nearly impossible.

U.S. patent application Ser. No. 09/285,611, assigned to the same assignee of the present invention and herein incorporated by reference, discloses a system and method for processing historical repair data and fault log data, which is not restricted to sequential occurrences of fault log entries and which provides weighted repair and distinct fault cluster combinations, to facilitate analysis of new fault log data from a malfunctioning machine. Further, U.S. patent application Ser. No. 09/285,612, assigned to the same assignee of the present invention and herein incorporated by reference, discloses a system and method for analyzing new fault log data from a malfunctioning machine in which the system and method are not restricted to sequential occurrences of fault log entries, and wherein the system and method predict one or more repair actions using predetermined weighted repair and distinct fault cluster combinations.

Further, U.S. patent application Ser. No. 09/495,696, titled, "A Method and System for Analyzing Fault and Snapshot Operational Parameter Data For Diagnostics of Machine Malfunctions", and assigned to the same assignee of the present invention and herein incorporated by reference, discloses a system and method that uses snapshot observations of operational parameters from the machine in combination with the fault log data in order to further enhance the predictive accuracy the diagnostic algorithms used therein. Thus, it will be appreciated that the fault log data may conveniently comprise snapshot data, that is, substantially instantaneous observations of predetermined operational parameters of the machine recorded during the logging of a respective fault. In each of the foregoing approaches, it would be desirable to have a process and system that allows a field or diagnostic engineer or any other personnel involved in maintaining and/or servicing the machine to systematically analyze the fault log data so as to identify respective faults and/or respective combinations of faults that otherwise could be missed. It will be appreciated that since the fault log data contains useful information in order to detect incipient failures, it is desirable to accurately identify any such faults and/or combinations so that such personnel is able to proactively make repair recommendations and thus avoid loss of good will with clients as well as costly delays that could result in the event of a mission failure of the machine. An example of a mission failure would be a failed locomotive unable to deliver cargo to its destination and possibly causing traffic gridlock in a given railtrack. It would be further desirable to be able to provide to such personnel an inexpensive and user-friendly fault analysis kit, such as a flowchart, check list, software program, etc., that would quickly allow such personnel to compare any new fault log data downloaded from the machine with prior fault log data of the same machine so as to be able to issue accurate and reliable repair recommendations to the entity responsible for operating the locomotive.

BRIEF SUMMARY OF THE INVENTION

Generally speaking, the present invention fulfills the foregoing needs by providing a process for analyzing fault log data from a machine so as to identify respective faults and/or fault combinations predictive of machine malfunctions. The process allows for downloading new fault log data from the machine. The process further allows for retrieving prior fault log data of the machine. The prior fault log data may be obtained during an earlier download relative to a present download of new fault log data. A comparing step allows for comparing the new fault log data against the prior fault log data, and an adjusting step allows for adjusting any repair recommendations for the earlier download of fault log data based upon the comparison of the new fault log data and the prior fault log data. In another aspect of this invention, it will be appreciated that the foregoing process may be used for developing a fault analysis kit, either in electronic form suitable for computerized processing or otherwise, e.g., a check list, flowchart, instruction chart, software program, etc., that enables respective users to systematically and accurately analyze the fault log data from the machine so as to be able to identify the respective faults and/or fault combinations which are predictive of machine malfunctions of the machine.

The present invention further fulfills the foregoing needs by providing a system for analyzing fault log data from a machine. The system includes means for downloading new fault log data from the machine. The system further includes means for retrieving prior fault log data of the machine. The prior fault log data may be generally obtained during an earlier download relative to a present download of new fault log data. Comparing means allows for comparing the new fault log data against the prior fault log data, and adjusting means allows for adjusting any repair recommendations for the earlier download of fault log data based upon the comparison of the new fault log data and the prior fault log data.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
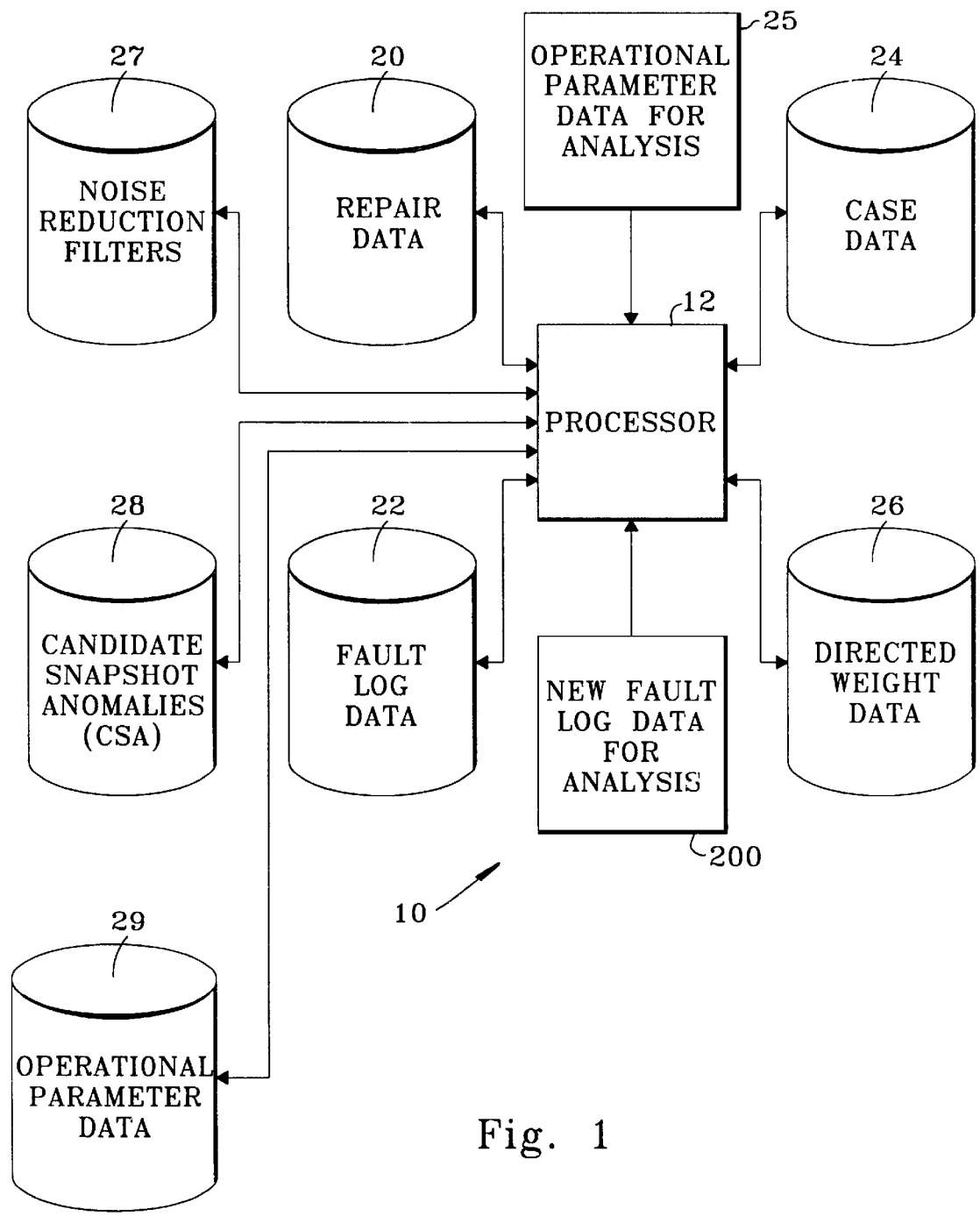
FIG. 1 is a block diagram of an exemplary system that may readily benefit from the teachings of the present invention and uses a processor for processing operational parameter data and fault log data from one or more machines and for diagnosing a malfunctioning machine.

FIG. 1 diagrammatically illustrates one embodiment of a diagnostic system 10 that may readily benefit from the teachings of the present invention. System 10 provides a process for automatically harvesting or mining repair data comprising a plurality of related and unrelated repairs and fault log data comprising a plurality of faults, from one or more machines such as locomotives, and generating weighted repair and distinct fault cluster combinations which are diagnostically significant predictors to facilitate analysis of new fault log data from a malfunctioning locomotive. In one aspect of the invention, system 10 allows for hybridly analyzing the fault log data jointly with operational parameters from the machine.

Although the present invention is described with reference to a locomotive, system 10 can be used in conjunction with any machine in which operation of the machine is monitored, such as a chemical, an electronic, a mechanical, or a microprocessor machine.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to and processes data contained in a repair data storage unit 20 and a fault log data storage unit 22. Processor 12 is further respectively connected to and processes noise-reduction filters stored in a storage unit 27, and candidate snapshot anomalies stored in a storage unit 28.

Figure 2B:
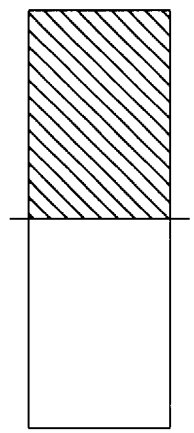
FIG. 2 (collectively made up of FIGS. 2A and 2B) is an illustration of exemplary repair log data.

Repair data storage unit 20 includes repair data or records regarding a plurality of related and unrelated repairs for one or more locomotives. FIG. 2 shows an exemplary portion 30 of the repair data contained in repair data storage unit 20. The repair data may include a customer identification number 32, a locomotive identification or unit number 33, the date 34 of the repair, the repair code 35, a repair code description 36, a description of the actual repair 37 performed, etc.

Figure 3A:
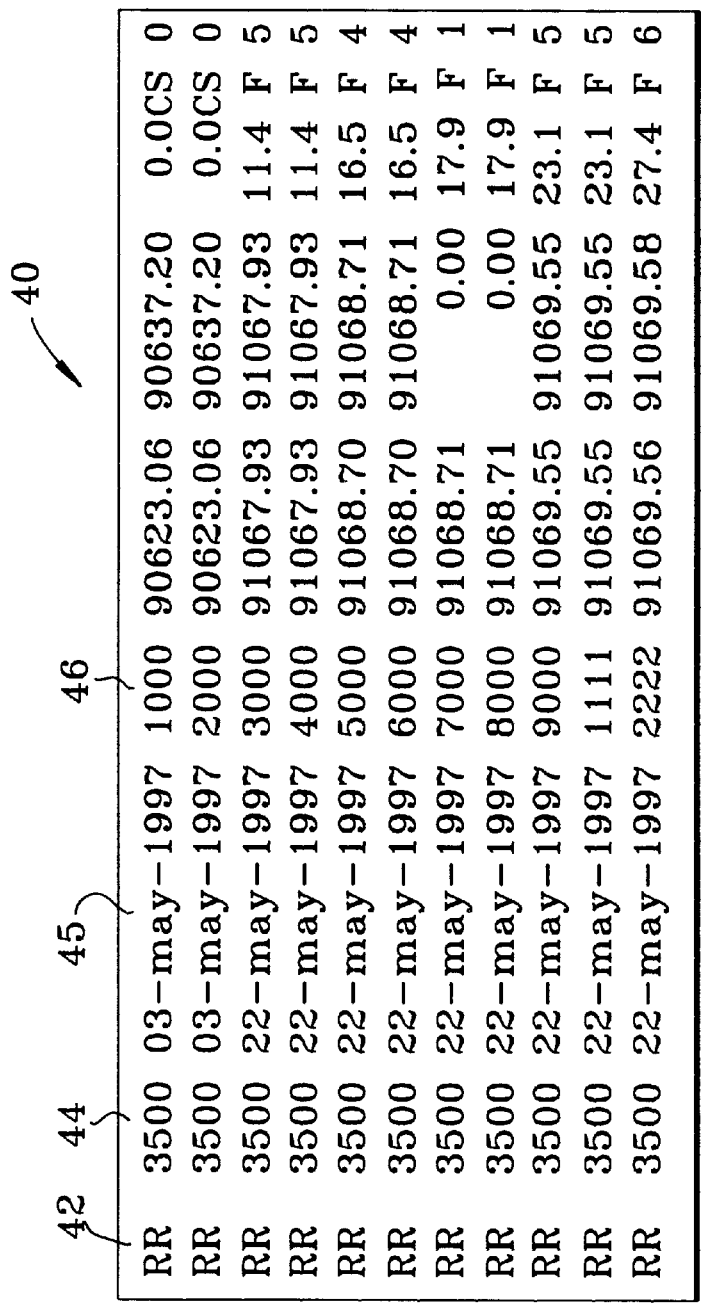
FIG. 3 (collectively made up of FIGS. 3A and 3B) is an illustration of exemplary fault log data.
Figure 3A:
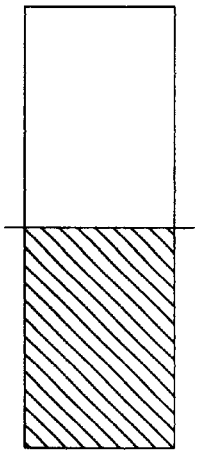
Figure 3B:
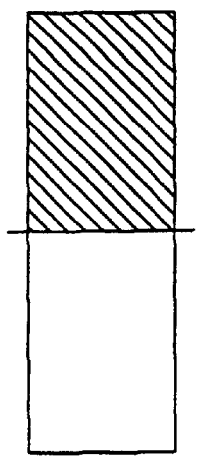

Fault log data storage unit 22 includes fault log data or records regarding a plurality of faults occurring prior to the repairs for the one or more locomotives. FIG. 3 shows an exemplary portion 40 of the fault log data contained in fault log data storage unit 22. The fault log data may include a customer identification number 42, a locomotive identification number or unit 44, the date 45 when the fault occurred, a fault code 46, a fault code description 48, etc.

As suggested above, additional data used in the analysis of the present invention include operational parameter data indicative of a plurality of operational parameters or operational conditions of the machine. The operational parameter data may be obtained from various sensor readings or observations, e.g., temperature sensor readings, pressure sensor readings, electrical sensor readings, engine power readings, etc. Examples of operational conditions of the machine may include whether the locomotive is operating in a motoring or in a dynamic braking mode of operation, whether any given subsystem in the locomotive is undergoing a self-test, whether the locomotive is stationary, whether the engine is operating under maximum load conditions, etc. It will be appreciated by those skilled in the art that the repair data storage unit, the fault log data storage unit, and the operational parameter data storage unit may respectively contain repair data, fault log data and operational parameter data for a plurality of different locomotives. It will be further appreciated that the operational parameter data may be made up of snapshot observations, i.e., substantially instantaneous readings or discrete samples of the respective values of the operational parameters from the locomotive. Preferably, the snapshot observations are temporally aligned relative to the time when respective faults are generated or logged in the locomotive. For example, the temporal alignment allows for determining the respective values of the operational parameters from the locomotive prior, during or after the logging of respective faults in the locomotive. The operational parameter data need not be limited to snapshot observations since substantially continuous observations over a predetermined period of time before or after a fault is logged can be similarly obtained. This feature may be particularly desirable if the system is configured for detection of trends that may be indicative of incipient failures in the locomotive.

Figure 4:
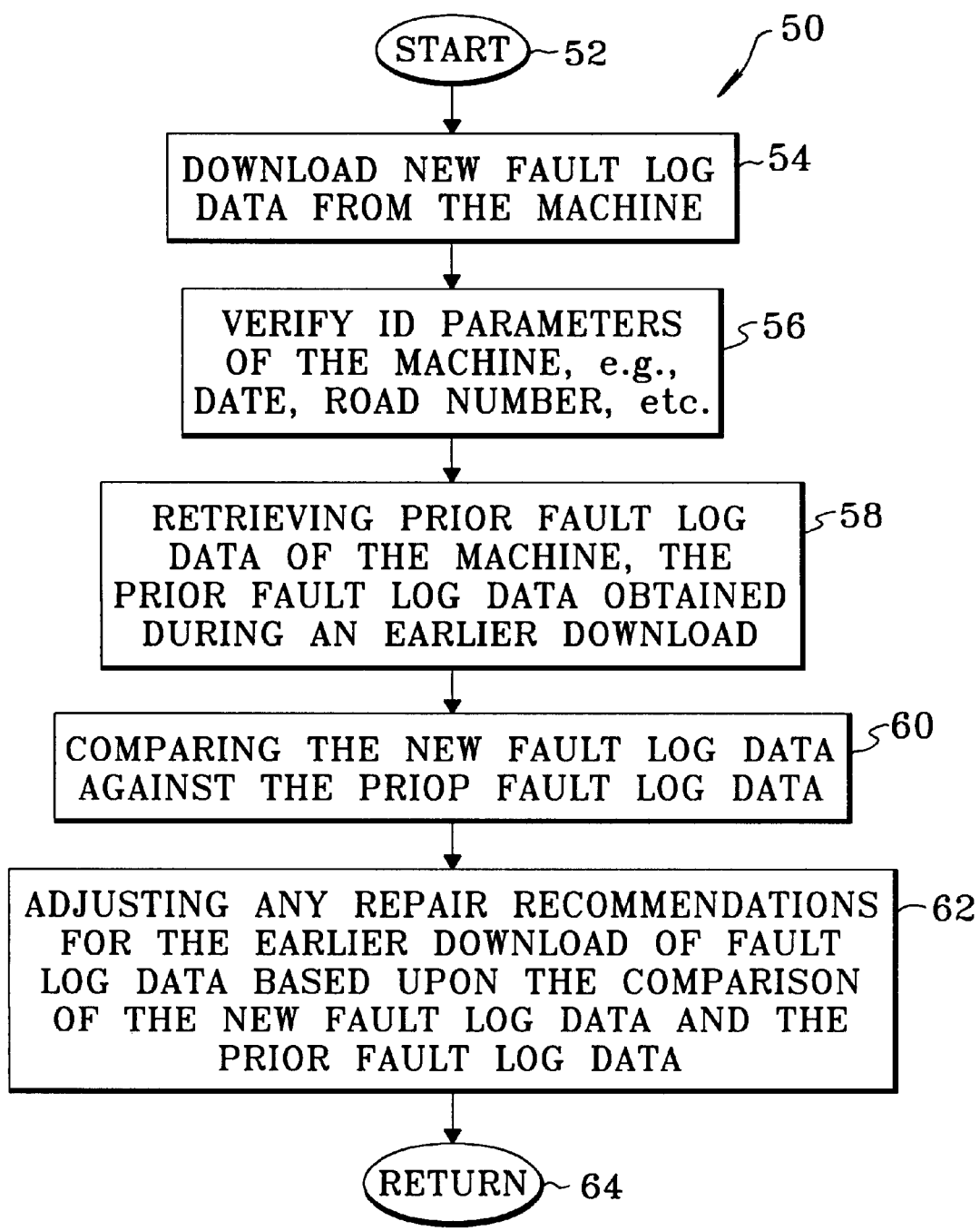
FIG. 4 is a flow chart of an exemplary embodiment of the process of the present invention for analyzing fault log data so as to identify respective faults and/or fault combinations predictive of machine malfunctions.

FIG. 4 shows a flow chart of an exemplary embodiment of a process 50 for analyzing fault log data so as to avoid missing detection or identification of fault log data which is statistically and probabilistically relevant to early and accurate prediction of machine malfunctions. Upon start of operations at step 52, step 54 allows for downloading new fault log data from the machine. Step 56 allows for verifying predetermined identification parameters of the newly downloaded fault log data so as to avoid unintentionally attributing faults to the wrong locomotive. Exemplary identification parameters may include road number, time of download, time fault was logged, etc. For example, this step may allow for verifying that the road number in a previously downloaded fault log actually matches the road number of the locomotive fault log presently intended to be downloaded and may further allow for verifying that the date and time in the fault log matches the present date and time. Step 58 allows for retrieving prior fault log data of the machine. The prior fault log may be obtained during an earlier download, such as the last download executed prior the download of step 54. As described in greater detail in the context of FIG. 5 below, step 60 allows for comparing the new fault log data against the prior fault log data. Prior to return step 64, step 62 allows for adjusting any repair recommendations for the earlier download of fault log data based upon the comparison of the new fault log data and the prior fault log data.

Figure 5:
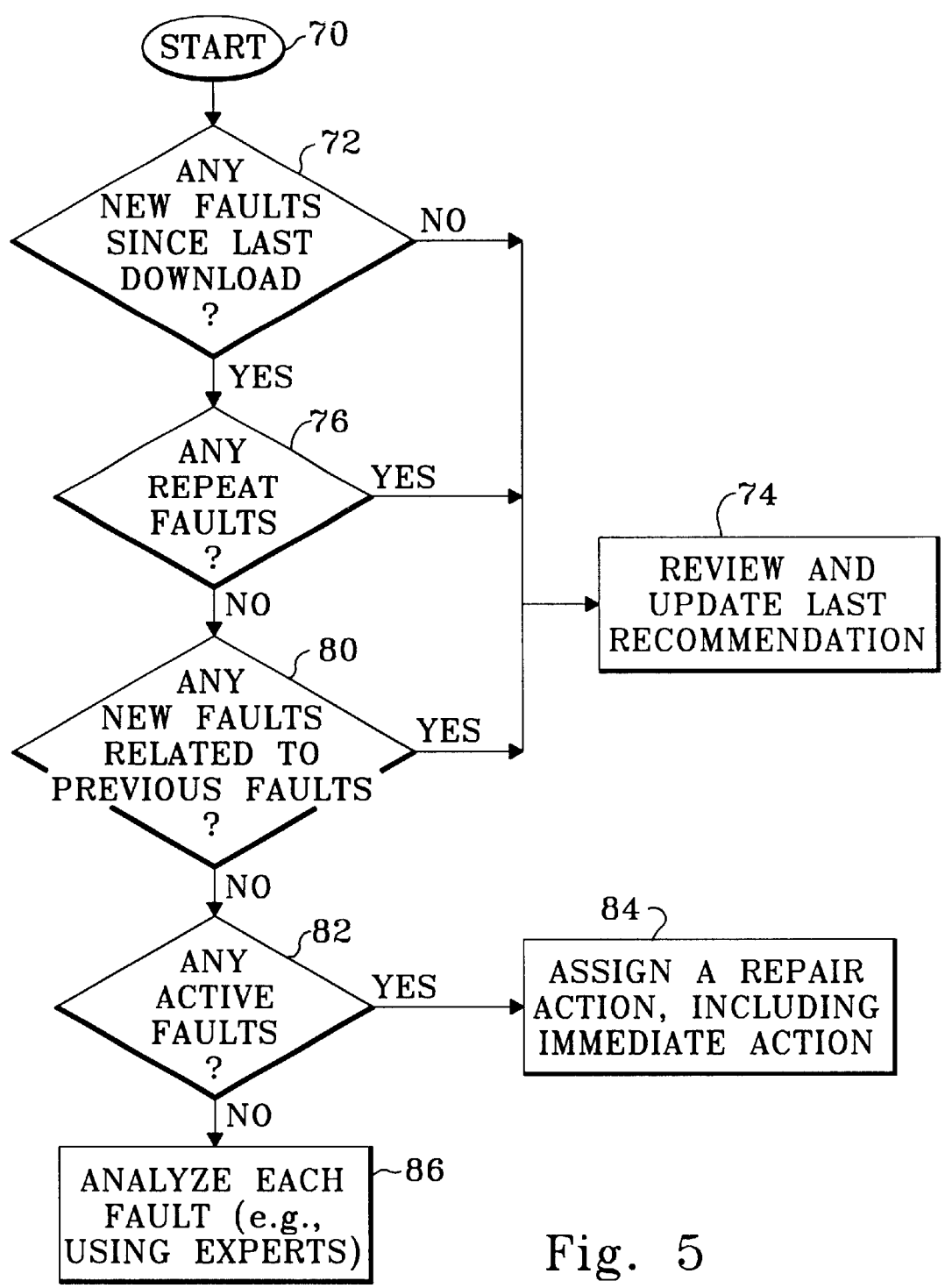
FIG. 5 is a flow chart illustrating further details in connection with the process of FIG. 4.

FIG. 5 is a flowchart that illustrates further details regarding process 50 (FIG. 4). Subsequent to start step 70, step 72 allows for determining whether any new faults have occurred since the last download. If new faults have not been logged since the last download, then step 74 allows for reviewing and updating the last repair recommendation. If new faults were logged at step 72, then step 76 allows for determining whether any of the new faults are repeats of the previously logged faults, e.g., faults that previously required a recommendation.

If there are repeat faults, then, as suggested above, step 74 would allow for reviewing and updating the last repair recommendation. If there are no repeat faults, then step 80 allows for determining if the newly downloaded faults are related to any previously logged faults. By way of example and not of limitation, related faults generally affect the same machine subsystem, such as power grid faults and dynamic braking faults, both generally related to the dynamic braking subsystem of the locomotive. If the newly downloaded faults are related to previously logged faults, then once again, step 74 would allow for reviewing and updating the last repair recommendation. Step 82 allows for determining whether there are any active faults. If there are active faults, then step 84 allows for assigning a respective repair action. For example, the repair assignment may require to determine if the locomotive engineer should reset the faults, or if the locomotive should be checked first by one or more repair specialists. By way of example, any open or non-reset faults will show 0.00 in the reset column. An externally-derived set of instructions, such as may be contained in a fault analysis electronic database or hardcopy may be conveniently checked so as to determine whether any given fault is the type of fault that could result in locomotive damage if reset prior to conducting detailed investigation as to the cause of that fault. If no faults are active, then step 86 allows for conducting expert analysis on the fault. By way of example and not of limitation, the expert analysis may be performed by teams of experts who preferably have a reasonably thorough understanding of respective subsystems of the locomotive and their interaction with other subsystems of the locomotive. For example, one team may address fault codes for the traction subsystem of the locomotive. Another team may address faults for the engine cooling subsystem, etc. As suggested above, each of such teams may also interact with the diagnostics experts in order to insure that the newly identified faults and/or respective combinations thereof are fully compatible with any of the diagnostics techniques used for running diagnostics on any given locomotive.

Figure 6:
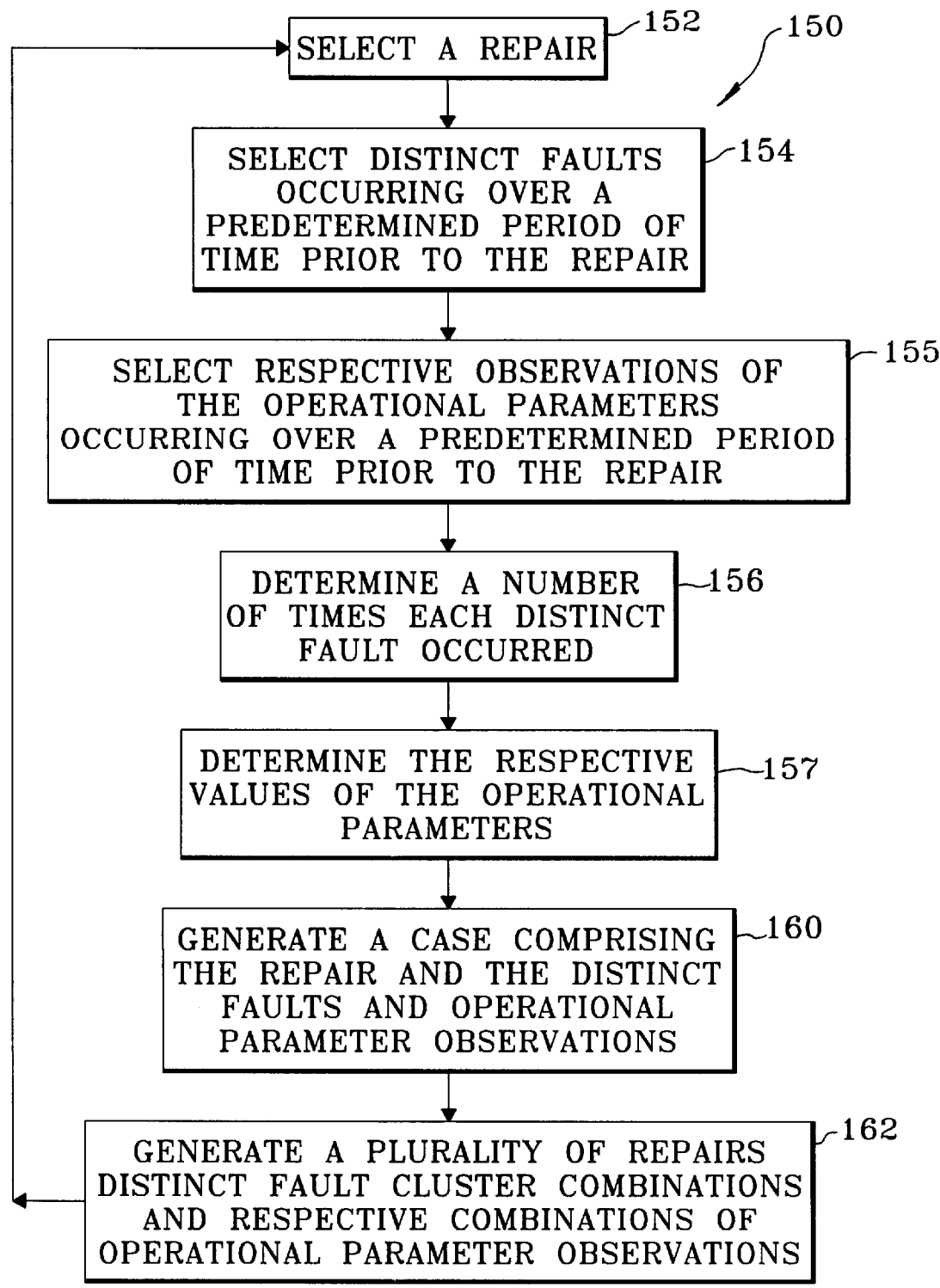
FIG. 6 is a flow chart describing steps for generating a plurality of respective cases, including predetermined repairs, fault cluster combinations and operational parameter observations for each case.

FIG. 6 is a flowchart of an exemplary process 150 for selecting or extracting repair data from repair data storage unit 20, fault log data from fault log data storage unit 22, and operational parameter data from operational parameter data storage unit 29 and generating a plurality of diagnostic cases, which are stored in a case storage unit 24. As used herein, the term "case" comprises a repair and one or more distinct faults or fault codes in combination with respective observations of one or more operational parameters.

With reference still to FIG. 6, process 150 comprises, at 152, selecting or extracting a repair from repair data storage unit 20 (FIG. 1). Given the identification of a repair, the present invention searches fault log data storage unit 22 (FIG. 1) to select or extract, at 154, distinct faults occurring over a predetermined period of time prior to the repair. Similarly, operational parameter data storage unit 29 (FIG. 1) may be searched to select or extract, at 155, respective observations of the operational parameter data occurring over a predetermined period of time prior to the repair. Once again, the observations may include snapshot observations, or may include substantially continuous observations that would allow for detecting trends that may develop over time in the operational parameter data and that may be indicative of malfunctions in the machine. The predetermined period of time may extend from a predetermined date prior to the repair to the date of the repair. Desirably, the period of time extends from prior to the repair, e.g., 14 days, to the date of the repair. It will be appreciated that other suitable time periods may be chosen. The same period of time may be chosen for generating all of the cases.

At 156, the number of times each distinct fault occurred during the predetermined period of time is determined. At 157, the respective values of the observations of the operational parameters is determined. A plurality of repairs, one or more distinct fault cluster and respective observations of the operational parameters are generated and stored as a case, at 160. For each case, a plurality of repair, respective fault cluster combinations, and respective combinations of clusters of observations of the operational parameters is generated at 162.

As suggested above, the present invention provides in one of its aspects, a process and system for developing a fault log data analysis kit that enables users to analyze fault log data from a machine so as to identify faults and/or fault combinations predictive of machine malfunctions. It will be appreciated by those skilled in the art that the kit may be deployed in any suitable form, electronic or otherwise, e.g., a flowchart, a checklist, a computer program product configured in any suitable computer-usable medium and having a computer-readable code therein for executing the respective process steps discussed above in the context of FIGS. 4 and 5, etc. By way of example, the output of the fault analysis kit and/or process of the present invention could be used for opening respective cases in the case data storage unit 24, such as during situations when system 10 may be unavailable, for example, due to maintenance and/or upgrading. Thus, in another aspect of the present invention, the tool analysis kit of the present invention may provide backup to system 10 as well as enhance any CBR analysis performed on the fault log data by system 10. It will be appreciated that when initially setting up case data storage unit 24, a field engineer may review each of the plurality of cases to determine whether the collected data, either fault log data and/or operational parameter data, provide a good indication of the repair. If not, one or more cases can be excluded or removed from case data storage unit 24. This review by a field engineer would increase the initial accuracy of the system in assigning weights to the repair, candidate snapshot malfunctions and fault cluster combinations.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A process for analyzing fault log data from a machine so as to identify respective faults and/or fault combinations predictive of machine malfunctions, the process comprising:
   a) downloading new fault log data from the machine;
   b) retrieving prior fault log data of the machine, the prior fault log data obtained during an earlier download relative to the download of step a), wherein the earlier download of fault log data comprises the last download executed prior to the download of step a);
   c) comparing the new fault log data against the prior fault log data, wherein the comparing step comprises determining respective occurrences of any new faults since the last download;
   d) classifying any new faults in a respective classification selected from the group consisting of active or inactive faults;
   e) executing expert analysis on any faults classified as inactive;
   f) assigning a respective repair action to any faults classified as active; and
   g) adjusting any repair recommendations for the earlier download of fault log data based upon the comparison of the new fault log data and the prior fault log data.

2. The process of claim 1 wherein the comparing step comprises determining respective occurrences of any repeat faults.

3. The process of claim 2 wherein the comparing step comprises determining whether any repeat faults are related to one another.

4. The process of claim 1 wherein the comparing step comprises determining whether any new faults are related to one another.

5. The process of claim 1 wherein the repair action is based upon matching respective repair entries in an externally-derived file of repairs, each fault being associated with at least one or more repairs.

6. The process of claim 1 wherein the machine is a locomotive.

7. A system for analyzing fault log data from a machine so as to identify respective faults and/or fault combinations predictive of machine malfunctions, the system comprising:
   means for downloading new fault log data from the machine;
   means for retrieving prior fault log data of the machine, the prior fault log data obtained during an earlier download relative to a present download of new fault log data, wherein the earlier download of fault log data comprises the last download executed prior to the present download of new fault log data;
   means for comparing the new fault log data against the prior fault log data;
   means for determining respective occurrences of any new faults since the last download;
   means for classifying any new faults in a respective classification selected from the group consisting of active or inactive faults;
   means for executing expert analysis on any faults classified as inactive;
   means for assigning a respective repair action to any faults classified as active; and
   means for adjusting any repair recommendations for the earlier download of fault log data based upon the comparison of the new fault log data and the prior fault log data.

8. The system of claim 7 further comprising means for determining respective occurrences of any repeat faults.

9. The system of claim 8 further comprising means for determining whether any repeat faults are related to one another.

10. The system of claim 7 further comprising means for determining whether any new faults are related to one another.

11. The system of claim 7 wherein the repair action is based upon matching respective repair entries in an externally-derived file of repairs, each active fault being associated with at least one or more repairs.

12. The system of claim 7 wherein the machine is a locomotive.

13. A process for developing a kit that enables respective users to analyze fault log data from a machine so as to identify respective faults and/or fault combinations predictive of machine malfunctions, the process comprising:
   a) downloading new fault log data from the machine;
   b) retrieving prior fault log data of the machine, the prior fault log data obtained during an earlier download relative to the download of step a), wherein the earlier download of fault log data comprises the last download executed prior to the download of step a);
   c) comparing the new fault log data against the prior fault log data;
   d) classifying any new faults in a respective classification selected from the group consisting of active or inactive faults;
   e) executing expert analysis on any faults classified as inactive;
   f) assigning a respective repair action to any faults classified as active; and
   g) adjusting any repair recommendations for the earlier download of fault log data based upon the comparison of the new fault log data and the prior fault log data.

14. The process of claim 13 wherein the comparing step comprises determining respective occurrences of any new faults since the last download.

15. The process of claim 13 wherein the comparing step comprises determining respective occurrences of any repeat faults.

16. The process of claim 15 wherein the comparing step comprises determining whether any repeat faults are related to one another.

17. The process of claim 13 wherein the comparing step comprises determining whether any new faults are related to one another.

18. The process of claim 13 wherein the repair action is based upon matching respective repair entries in an externally-derived file of repairs, each active fault being associated with at least one or more repairs.

19. The process of claim 13 wherein the fault log data further comprises snapshot observations of predetermined operational parameters from the machine.

20. The process of claim 13 wherein the machine is a locomotive.

21. A computer program product comprising a computer-usable medium having a computer-readable code therein for executing the steps comprising:

a) downloading new fault log data from the machine;
b) retrieving prior fault log data of the machine, the prior fault log data obtained during an earlier download relative to the download of step a), wherein the earlier download of fault log data comprises the last download executed prior to the download of step a);
c) comparing the new fault log data against the prior fault log data;
d) classifying any new faults in a respective classification, wherein the respective classification of new faults is selected from the group consisting of active or inactive faults;
e) classifying any new faults in a respective classification including a classification of active faults; and
f) assigning a respective repair action to any faults classified as active.

22. A process for analyzing fault log data from a machine to identify respective faults and/or fault combinations predictive of machine malfunctions, the process comprising:
a) downloading new fault log data from the machine;
b) retrieving prior fault log data of the machine, the prior fault log data obtained during an earlier download relative to the download of step a);
c) comparing the new fault log data against the prior fault log data, wherein the comparing step comprises determining respective occurrences of any new faults since the earlier download;
d) classifying any new faults in a respective classification, including a classification of active faults;
e) assigning a respective repair action to any faults classified as active; and
f) adjusting any repair recommendations for the earlier download of fault log data based upon the comparison of the new fault log data and the prior fault log data.

23. The process of claim 22 wherein the earlier download of fault log data comprises the last download executed prior to the download of step a).

24. The process of claim 22 wherein the comparing step comprises determining respective occurrences of any repeat faults.

25. The process of claim 22 wherein the comparing step comprises determining whether any repeat faults are related to one another.

26. The process of claim 22 wherein the comparing step comprises determining whether any new faults are related to one another.

27. The process of claim 26 wherein the respective classification of new faults further includes inactive faults.

28. The process of claim 27 further comprising a step of executing expert analysis on any faults classified as inactive.

29. The process of claim 22 wherein the repair action is based upon matching respective repair entries in an externally-derived file of repairs, each fault being associated with at least one or more repairs.

30. A system for analyzing fault log data from a machine so as to identify respective faults and/or fault combinations predictive of machine malfunctions, the system comprising:
a processor configured to download new fault log data from the machine;
a processor configured to retrieve prior fault log data of the machine stored in a database, the prior fault log data obtained during an earlier download relative to a present download of new fault log data;
a processor configured to determine respective occurrences of any new faults since the earlier download;
a processor configured to classify any new faults in a respective classification, including a classification of active faults;
a processor configured to assign a respective repair action to any faults classified as active;
a processor configured to compare the new fault log data against the prior fault log data; and
a processor configured to adjust any repair recommendations for the earlier download of fault log data based upon the comparison of the new fault log data and the prior fault log data.

* * * * *